(12) United States Patent
Thommana et al.

(10) Patent No.: US 11,451,291 B2
(45) Date of Patent: Sep. 20, 2022

(54) SATELLITE NETWORKED HIGH FREQUENCY TERMINAL TO TERMINAL COMMUNICATIONS

(71) Applicant: Rockwell Collins, Inc., Cedar Rapids, IA (US)

(72) Inventors: John V. Thommana, Cedar Rapids, IA (US); Joseph Splean, II, Ely, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/139,068

(22) Filed: Dec. 31, 2020

(65) Prior Publication Data

US 2022/0209852 A1 Jun. 30, 2022

(51) Int. Cl.
*H04B 7/185* (2006.01)
*H04W 84/18* (2009.01)

(52) U.S. Cl.
CPC ......... *H04B 7/18513* (2013.01); *H04W 84/18* (2013.01)

(58) Field of Classification Search
CPC . H04W 84/06; H04W 16/14; H04W 72/0413; H04W 72/042; H04W 84/18; H04B 7/15557; H04B 17/318; H04B 7/185; H04B 7/1851; H04B 7/18513; Y02D 30/70
See application file for complete search history.

(56) References Cited

U.S. PATENT DOCUMENTS

| | | |
|---|---|---|
| 5,428,600 A | 6/1995 | Potier |
| 5,986,619 A | 11/1999 | Grybos et al. |
| 6,340,956 B1 | 1/2002 | Bowen et al. |
| 9,282,500 B1 | 3/2016 | Thommana et al. |
| 10,116,382 B1 | 10/2018 | Thommana et al. |
| 10,117,249 B2 | 10/2018 | Ravishankar et al. |
| 10,277,306 B2 | 4/2019 | Chang |

(Continued)

FOREIGN PATENT DOCUMENTS

WO 2020124076 A1 6/2020

OTHER PUBLICATIONS

Phillips, G. J. et al., "The Use of the 26 MHz Band for Satellite Broadcasting", Research Department, Engineering Division, British Broadcasting Corporation, Jul. 1980, 16 pages.

(Continued)

*Primary Examiner* — Fred A Casca

(74) *Attorney, Agent, or Firm* — Suiter Swantz pc llo

(57) ABSTRACT

A system may include an ad hoc satellite network including multiple satellites, a first terminal, and a second terminal. Each of the first satellite and a second satellite of the multiple satellites may include: a receive high frequency (HF) antenna configured to receive HF signals; a transmit HF antenna configured to transmit HF signals; an inter-satellite transmitter configured to transmit signals to another satellite of the ad hoc satellite network; an inter-satellite receiver configured to receive signals from another satellite of the ad hoc satellite network; and a processor. The first terminal may include an HF transmit antenna configured transmit an HF communication payload to the ad hoc satellite network. The second terminal may include an HF receive antenna configured receive the HF communication payload from the ad hoc satellite network.

19 Claims, 4 Drawing Sheets

(56) References Cited

U.S. PATENT DOCUMENTS

| | | |
|---|---|---|
| 10,523,312 B1 | 12/2019 | Tong et al. |
| 10,524,185 B2 | 12/2019 | Kay et al. |
| 10,713,956 B2 | 7/2020 | Miller et al. |
| 2002/0150060 A1 | 10/2002 | Montpetit |
| 2006/0050772 A1* | 3/2006 | Shemesh ................ G04R 20/02 |
| | | 375/145 |
| 2009/0092074 A1 | 4/2009 | Jamalipour et al. |
| 2014/0016941 A1 | 1/2014 | Coleman et al. |
| 2016/0037434 A1 | 2/2016 | Gopal et al. |
| 2018/0323863 A1 | 11/2018 | Bournes |
| 2019/0028197 A1 | 1/2019 | Turner et al. |
| 2019/0074857 A1* | 3/2019 | Kolanski .............. H04B 1/3877 |
| 2019/0335535 A1* | 10/2019 | Li ......................... H04W 72/02 |
| 2020/0024012 A1* | 1/2020 | Fortezza .................. B64G 3/00 |
| 2020/0259560 A1 | 8/2020 | Tong et al. |
| 2021/0367664 A1* | 11/2021 | Akyildiz .............. H04B 7/1855 |

OTHER PUBLICATIONS

Extended Search Report in European Application No. 21218199.4 dated May 25, 2022, 10 pages.

Natarajan et al.: "Network architecture for mission critical communications using LEO satellites", Military Communications Conference, 2011—MILCOM 2011, IEEE, Nov. 7, 2011 (Nov. 7, 2011), pp. 2087-2092, XP032092894, DOI: 10.1109/MILCOM.011. 6127627 ISBN: 978-1-4673-0079-7 *Sections 2-3*.

* cited by examiner

400

402 — TRANSMITTING, BY A HIGH FREQUENCY (HF) TRANSMIT ANTENNA OF A FIRST TERMINAL, AN HF COMMUNICATION PAYLOAD TO AN AD HOC SATELLITE NETWORK, THE AD HOC SATELLITE NETWORK INCLUDING MULTIPLE SATELLITES, SOME OR ALL OF THE MULTIPLE SATELLITES COMMUNICATIVELY COUPLED TO OTHER OF THE MULTIPLE SATELLITES AT ANY GIVEN TIME, THE MULTIPLE SATELLITES INCLUDING A FIRST SATELLITE AND A SECOND SATELLITE, EACH OF THE FIRST SATELLITE AND A SECOND SATELLITE COMPRISING: AT LEAST ONE RECEIVE HF ANTENNA CONFIGURED TO RECEIVE HF SIGNALS; AT LEAST ONE TRANSMIT HF ANTENNA CONFIGURED TO TRANSMIT HF SIGNALS; AT LEAST ONE INTER-SATELLITE TRANSMITTER CONFIGURED TO TRANSMIT SIGNALS TO AT LEAST ONE OTHER SATELLITE OF THE AD HOC SATELLITE NETWORK; AT LEAST ONE INTER-SATELLITE RECEIVER CONFIGURED TO RECEIVE SIGNALS FROM AT LEAST ONE OTHER SATELLITE OF THE AD HOC SATELLITE NETWORK; AND AT LEAST ONE PROCESSOR COMMUNICATIVELY COUPLED TO THE AT LEAST ONE RECEIVE HF ANTENNA, THE AT LEAST ONE MULTI-BAND TRANSMIT HF ANTENNA, THE AT LEAST ONE INTER-SATELLITE TRANSMITTER, AND THE AT LEAST ONE INTER-SATELLITE RECEIVER

404 — RECEIVING, BY AN HF RECEIVE ANTENNA OF A SECOND TERMINAL, THE HF COMMUNICATION PAYLOAD FROM THE AD HOC SATELLITE NETWORK

FIG.4

SATELLITE NETWORKED HIGH FREQUENCY TERMINAL TO TERMINAL COMMUNICATIONS

BACKGROUND

High frequency (HF) communication is unique in that the frequency required to link two radios is dependent on the time of day, sunspot cycle, distance between the nodes, and even time of the year. As a result, networking multiple geographically separated nodes is even more difficult because each link potentially requires operation on a separate frequency, and nearly all existing HF radios are single channel radios capable of transmitting and receiving only a single frequency at a time.

Current HF communication is a beyond line of sight point to point communication system that is subject to random ionospheric perturbations that reduce the average daily sustained data rate to tens of kbps per second even though burst rate of 240 kbps are possible.

The HF communication problem is complicated further by the limitations of the antenna. For example, manpack HF radios typically carry low power handling (e.g., less than 25 Watts) roll-able antennas that have poor gains (e.g., −16 decibel (isotropic) (dBi) at 2 Megahertz (MHz) and −2 dBi at 30 MHz), and transmit performance is typically limited by voltage standing wave ratio (VSWR), which varies considerably and appropriate chunks of spectrum need to be selected where transmit performance is acceptable.

At the other end, fixed site installations, such as an HF ground station (HFGS), typically use broadband antennas that occupy large areas and can transmit and receive on any frequency in the HF band without an antenna coupler and have gains of +6 dBi.

In the middle, are constrained platforms, such as airplanes, which typically use shunt antennas (−18 dBi to −10 dBi) and communicate through a coupler so that they can transmit on nearly all HF frequencies. These couplers have bandwidth limitations in that most couplers have a flat gain only over 3 to 10 kilohertz (kHz) at the low end of the band and around 48 kHz at the higher end. This is one of the reasons why newer Wideband HF (WBHF) standards currently only support bandwidths 48 kHz and lower.

Vehicular platforms typically use extendable whips (e.g., 16 to 32 feet in length) that require the use of a coupler (especially at high transmit powers) and typically have gains in the −5 to +2 dBi range.

SUMMARY

In one aspect, embodiments of the inventive concepts disclosed herein are directed to a system. The system may include an ad hoc satellite network including multiple satellites, a first terminal and a second terminal. Some or all of the multiple satellites may be communicatively coupled to other of the multiple satellites at any given time. The multiple satellites may include a first satellite and a second satellite. Each of the first satellite and a second satellite may include: a receive high frequency (HF) antenna configured to receive HF signals; a transmit HF antenna configured to transmit HF signals; an inter-satellite transmitter configured to transmit signals to another satellite of the ad hoc satellite network; an inter-satellite receiver configured to receive signals from another satellite of the ad hoc satellite network; and a processor communicatively coupled to the receive HF antenna, the transmit HF antenna, the inter-satellite transmitter, and the inter-satellite receiver. The first terminal may include an HF transmit antenna configured to transmit an HF communication payload to the ad hoc satellite network. The second terminal may include an HF receive antenna configured receive the HF communication payload from the ad hoc satellite network.

In a further aspect, embodiments of the inventive concepts disclosed herein are directed to a method. The method may include: transmitting, by a high frequency (HF) transmit antenna of a first terminal, a HF communication payload to an ad hoc satellite network, the ad hoc satellite network including multiple satellites, some or all of the multiple satellites communicatively coupled to other of the multiple satellites at any given time, the multiple satellites including a first satellite and a second satellite, each of the first satellite and a second satellite comprising: a receive HF antenna configured to receive HF signals; a transmit HF antenna configured to transmit HF signals; an inter-satellite transmitter configured to transmit signals to another satellite of the ad hoc satellite network; an inter-satellite receiver configured to receive signals from another satellite of the ad hoc satellite network; and a processor communicatively coupled to the receive HF antenna, the transmit HF antenna, the inter-satellite transmitter, and the inter-satellite receiver; and receiving, by an HF receive antenna of a second terminal, the HF communication payload from the ad hoc satellite network.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a diagram of an exemplary embodiment of a method according to the inventive concepts disclosed herein.

DETAILED DESCRIPTION

Figure 1:
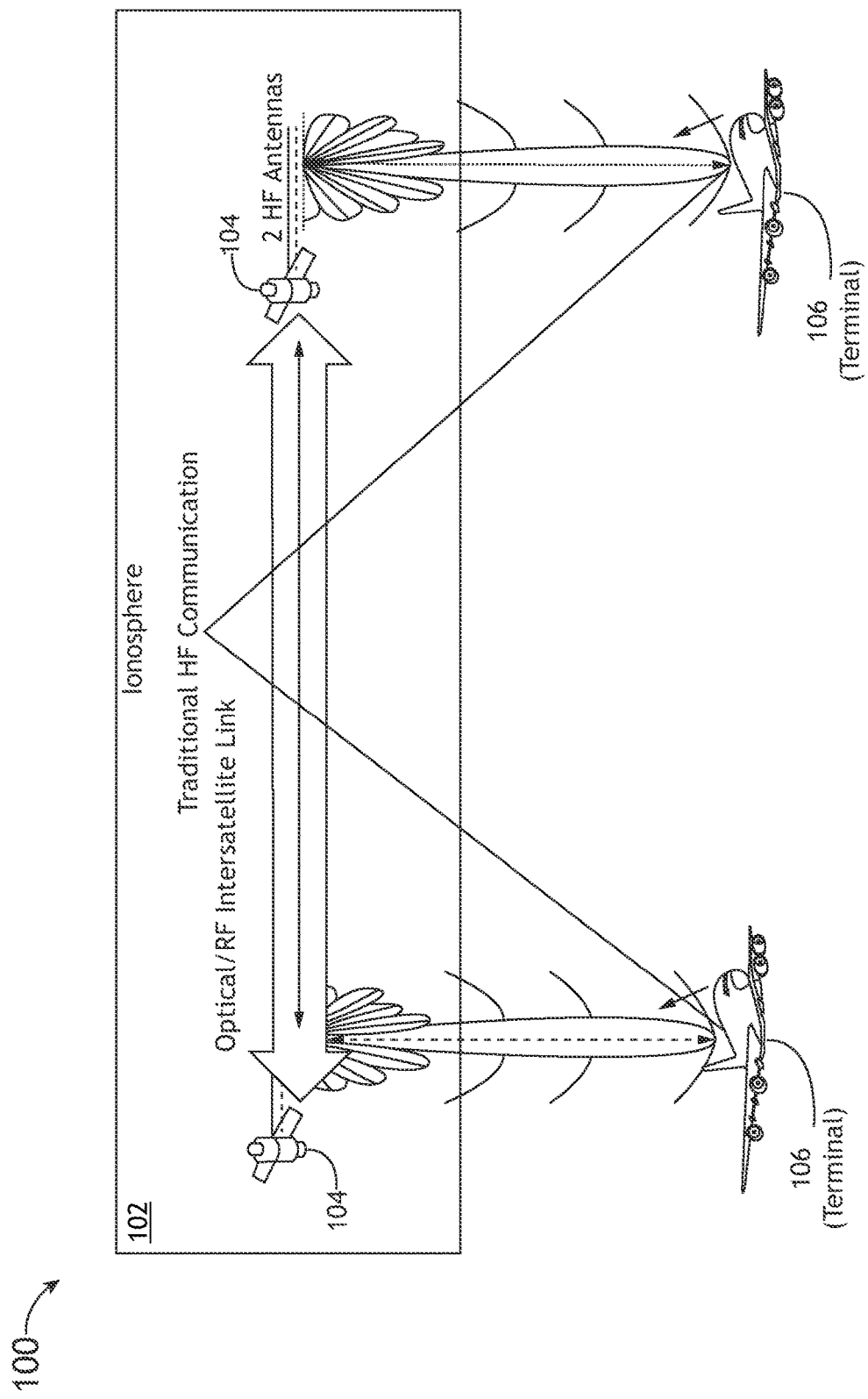
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method for satellite networked high frequency terminal to terminal communications.

Some embodiments ensure that data rates between 48 kilobits per second (kbps) and 96 kbps can be consistently delivered with 25 Watts (W) of transmit power using a processing HF low earth orbit (LEO) satellite. Some embodiments also enable mobile ad hoc network (MANET) networking of multiple geographically separated nodes. A network of LEO HF satellites may enable seamless ad-hoc networking of geographically separated HF nodes at sustained data rates between 48 kbps and 96 kbps during the day or night. The use of a wideband coupler-less HF system on the satellite may enable the satellite to receive on one frequency and transmit on another enabling anti-jam HF communication. For example, a coupler is typically bandwidth limited, it would be advantageous to use coupler-less communication to receive multiple channels simultaneously. In some embodiments, a coupler is only needed during transmit to match impedance of the radio (fixed) to antenna (changing with frequency). The earth to satellite system can be traditional HF/wideband HF (WBHF) links, where the satellite to earth HF links can be wider (e.g., 300 kHz) channels that are not impacted considerably by the ionosphere as the ionosphere is not used for refraction of the signals back to earth.

Today, HF is a point to point communication link. The data rate that can be delivered is dependent on the available transmit power and the condition of the ionospheric channel. There are considerable periods of time when no HF communication is possible. Some embodiments enable consistent data throughput between nodes at all times of the day as some embodiments do not rely on the ionosphere to refract the signal. A LEO satellite may intercept the communication and may use radiofrequency (RF) and/or optical inter-satellite links (ISLs) to reach a BLOS destination node.

Some embodiments may network multiple geographically separated nodes with variable antenna performance and power amplifiers sizes seamlessly.

Some embodiments may include satellite relayed HF communications. Some embodiments may use a processing satellite in low earth orbit with inter-satellite relaying using RF and/or optical inter-satellite links. Some embodiments may include seamless geographically separated HF networking enabled by a coupler-less satellite-based HF relay. For example, coupler-less HF operation may use a different type of antenna system than the broadband antennas that are typically used in HF.

As used throughout, robust may mean resistant to enemy jamming and interference.

As used throughout, spreading factor may mean the amount of redundancy introduced into the data rate to add robustness. For example, in Universal Mobile Telecommunications Service (UMTS) (3G Cellular) at the 9600 bits per second (bps) data rate, each data bit is multiplied by a 64-chip spreading factor code to make transmitted data more resistant to interference and jamming.

As used throughout, processing gain may be a metric to measure the robustness. For example, for a 64-chip spreading factor code, processing gain may be equal to $10*\log_{10}$ (Spreading Factor)=$10*\log_{10}$ (64)=18.06 decibel (dB).

Figure 2:
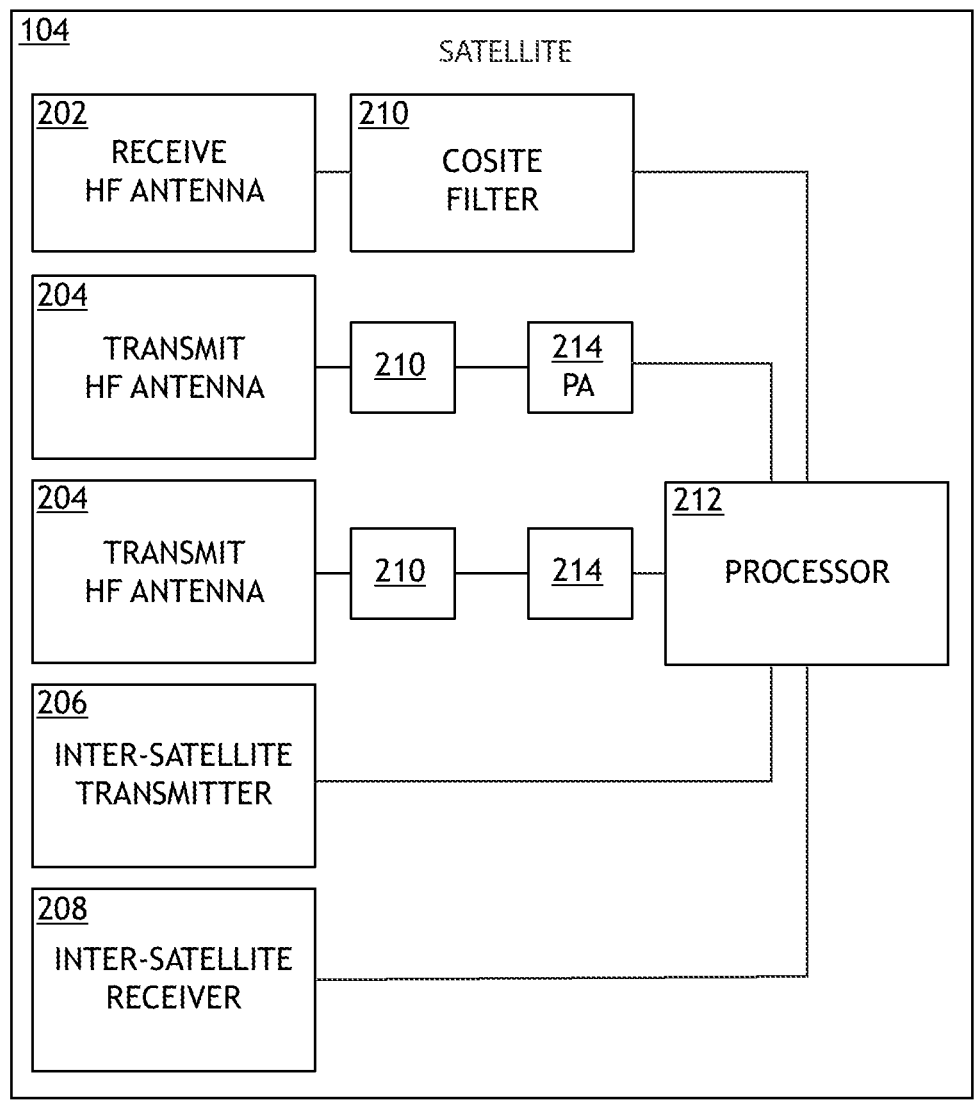
FIG. 2 is a view of an exemplary satellite of the ad hoc satellite network of the system of FIG. 1 of an exemplary embodiment according to the inventive concepts disclosed herein.
Figure 3:
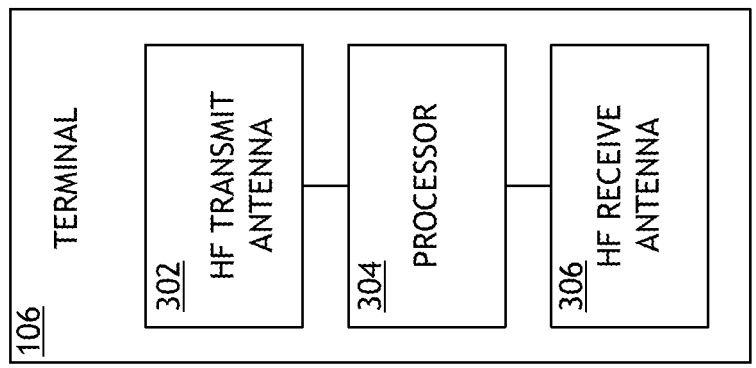
FIG. 3 is a view of an exemplary terminal of the system of FIG. 1 of an exemplary embodiment according to the inventive concepts disclosed herein.

Referring now to FIGS. 1-3, an exemplary embodiment of a system 100 according to the inventive concepts disclosed herein is depicted. The system 100 may be implemented as any suitable system. In some embodiments, the system 100 may be a network (e.g. a global network (e.g., a global mobile ad hoc network (MANET)). The system 100 may include an ad hoc satellite network 102 (e.g., a mobile ad hoc satellite network 102) and terminals 106.

The ad hoc satellite network 102 may including multiple satellites 104. Some or all of the multiple satellites 104 may be communicatively coupled to other of the multiple satellites 104 at any given time. The multiple satellites 104 may include a first satellite 104 and a second satellite 104. In some embodiments, the ad hoc satellite network 102 may be a global ad hoc satellite network 102. In some embodiments, the multiple satellites 104 may be low earth orbit (LEO) satellites 104. For example, the first satellite 104 and a second satellite 104 may be LEO satellites in or below the ionosphere such that the first satellite 104 and a second satellite 104 can communicate to and from earth using HF communications without reflection and/or refraction of HF signals caused by the ionosphere; however, other satellites of the ad hoc satellite network 102 may be non-LEO satellites (e.g., in Medium Earth Orbit (MEO) and/or Geostationary Earth Orbit (GEO)).

As shown in FIG. 2, for example, each of some or all of the satellites 104 (e.g., LEO satellites 104) may include: at least one receive high frequency (HF) antenna 202 (e.g., at least one receive-only HF antenna 202) configured to receive HF signals; at least one transmit HF antenna 204 (e.g., at least one fractal transmit HF antenna 204) configured to transmit HF signals; at least one inter-satellite transmitter 206 configured to transmit signals to at least one other satellite 104 of the ad hoc satellite network 102; at least one inter-satellite receiver 208 configured to receive signals from at least one other satellite 104 of the ad hoc satellite network 102; at least one cosite filter 210; at least one power amplifier (PA) 214; and/or at least one processor 212 communicatively coupled to the at least one receive HF antenna 202, the at least one transmit HF antenna 204, the at least one inter-satellite transmitter 206, the at least one inter-satellite receiver 208, the at least one cosite filter 210, and/or the at least one power amplifier 214. The at least one processor 212 may be implemented as any suitable type and number of processors. For example, the at least one processor 212 may include at least one general purpose processor (e.g., at least one central processing unit (CPU)), at least one digital signal processor (DSP), at least one application specific integrated circuit (ASIC), and/or at least one field-programmable gate array (FPGA). The at least one processor 212 may be configured to perform (e.g., collectively perform if more than one processor) and/or cause (e.g., collectively cause) to be performed any or all of the operations disclosed throughout. The at least one processor 212 may be configured to run various software applications or computer code stored (e.g., maintained) in a non-transitory computer-readable medium (e.g., memory) and configured to execute various instructions or operations. In some embodiments, some or all of the satellites 104 may be configured for coupler-less HF operation.

For example, fractal transmit HF antenna 204 may be used to trade off bandwidth flatness for increased size. The fractal transmit HF antenna 204 may provide multiple 300 kHz bands in the 5 MHz to 30 MHz HF band. This is equivalent to having multiple narrowband transmit antennas in one antenna, each with 300 kHz to 500 kHz of spectrally flat frequency chunks, that are impedance matched. In some embodiments, multiple fractal transmit HF antennas 204 may be used to get enough spectrally flat 300 to 500 kHz frequency chunks with a fixed impedance to the transmitter.

In some embodiments, the transmit HF antenna(s) 204 may be frequency constrained to permit coupler-less HF operation. For example, a single or multiple transmit-only antennas 202 may be used. These antennas 202, 204 may be spring-loaded to expand to a required length, such as between 32 and 200 feet, and may trail behind the satellite 104.

In some embodiments, the satellites 104 may use space wheels or rotating magnets to point the antennas 202, 204 directly underneath the satellite 104 or angled to communicate at a slant angle to the earth. In some embodiments, the inter-satellite transmitter 206 and inter-satellite receiver 208 may point outwards into space to communicate with satellites in higher orbits, if needed.

In some embodiments, the satellite 104 may have a direct sampling receiver that processes an entire bandwidth of interest. In some embodiments, to reduce thermal and power consumption issues, only sufficient processing power may be provided to handle 6 to 8 contiguous or non-contiguous channels.

In some embodiments, cosite filters 210 may be used if there are multiple transmitters on the satellite 104. For example, a low transmit power (e.g., 100 Watts) may enable use of space efficient cosite filters 210. Space and power concerns may favor use of one transmitter shared between the multiple transmit antennas 204.

As shown in FIG. 3, for example, the terminals 106 may include manpack terminals, ground vehicular terminals, airborne vehicular terminals, maritime vehicular terminals, and/or fixed site terminals. Each terminal 106 may include at least one HF transmit antenna 302 configured transmit an HF communication payload to the ad hoc satellite network 102, at least one processor 304, and/or at least one HF receive antenna 306 configured receive the HF communication payload from the ad hoc satellite network 102. Some or all of the HF transmit antenna 302, at least one HF receive antenna 306, and/or the at least one processor 304 may be communicatively coupled at any given time. The at least one processor 304 may be implemented as any suitable type and number of processors. For example, the at least one processor 304 may include at least one general purpose processor (e.g., at least one central processing unit (CPU)), at least one digital signal processor (DSP), at least one application specific integrated circuit (ASIC), and/or at least one field-programmable gate array (FPGA). The at least one processor 304 may be configured to perform (e.g., collectively perform if more than one processor) and/or cause (e.g., collectively cause) to be performed any or all of the operations disclosed throughout. The at least one processor 304 may be configured to run various software applications or computer code stored (e.g., maintained) in a non-transitory computer-readable medium (e.g., memory) and configured to execute various instructions or operations.

For example, the system 100 may include: a first terminal 106 including an HF transmit antenna 302 configured transmit an HF communication payload to the ad hoc satellite network 102; and a second terminal 106 including an HF receive antenna 306 configured receive the HF communication payload from the ad hoc satellite network 102.

In some embodiments, two different sets of satellites 104 in the network 100 may have HF visibility to the transmit and receive HF terminals 106 and ISL can bridge the two sets of satellites 104 to provide BLOS HF communication by routing the HF payload via the ISL. For example, some or all of the multiple satellites 104 may be communicatively coupled to other of the multiple satellites 104 at any given time via at least one of radiofrequency (RF) inter-satellite cross links or optical inter-satellite cross links. For example, a first group of multiple geographically separated satellites 104 of the global ad hoc satellite network 102 may be visible to the first terminal 106. For example, a second group of multiple geographically separated satellites 104 of the global ad hoc satellite network 102 may be visible to the second terminal 106. For example, successful transmission of the HF communication payload to the ad hoc satellite network 102 may be improved by visibility of the first group of multiple geographically separated satellites 104 by the first terminal 106 as compared to visibility of a single satellite 104. For example, successful reception of the HF communication payload from the ad hoc satellite network 102 may be improved by visibility of the second group of multiple geographically separated satellites 104 by the second terminal 106 as compared to visibility of a single satellite 104.

In some embodiments, the HF transmit antenna 302 of the first terminal 106 may be configured to transmit the HF communication payload to the first satellite 104 of the ad hoc satellite network 102, and the HF receive antenna 306 of the second terminal 106 may be configured to receive the HF communication payload from the second satellite 104 of the ad hoc satellite network 102.

In some embodiments, the HF transmit antenna 302 of the first terminal 102 may be configured to transmit the HF communication payload to the first satellite 104 of the ad hoc satellite network 102, and the HF receive antenna 306 of the second terminal 106 may be configured to receive the HF communication payload from the first satellite 104 of the ad hoc satellite network 102.

In some embodiments, the HF transmit antenna 302 of the first terminal 106 may be configured to transmit the HF communication payload on a first frequency to the ad hoc satellite network 102, and the HF receive antenna 306 of the second terminal 106 may be configured to receive the HF communication payload on a second frequency from the ad hoc satellite network 102, wherein the first frequency is different from the second frequency. For example, the second frequency may be pseudo-randomly selected by at least one of: at least one satellite 104 and/or at least one terminal 106. In some embodiments, at least one of the first frequency or the second frequency may be higher than is possible using an ionosphere reflective HF transmission.

In some embodiments, communication of the HF communication payload from the first terminal 106 to the second terminal 106 via the ad hoc satellite network 102 may have a higher level of robustness than is possible using an ionosphere reflective HF transmission.

In some embodiments, covert communication of the HF communication payload from the first terminal 106 to the second terminal 106 via the ad hoc satellite network 102 may be supported by using at least one of frequency hopping or direct sequence spreading.

Terrestrial and airborne HF networks typically rely on near vertical incidence skywave (NVIS) communication for short range communication (5-8 MHz) and sky-wave communication (12-22 MHz). In the current solar cycle, frequencies above 22 MHz typically pass unimpeded by the ionosphere into outer space, and hence are not used for ionosphere reflective HF transmission; however, in some embodiments, HF frequencies above 22 MHz may be supported (e.g., between the terminals 106 and the satellites 104) as satellites 104 may intercept the transmission within the ionosphere.

In some embodiments, large beam widths of space based antennas 202, 204 and antennas 302, 306 used on tactical platforms do not require any specialized pointing. One factor to account for is the maximum gain of the tactical platforms is frequency specific and oriented to the type of communication envisaged (e.g. NVIS, Sky wave). The degradation of antenna gains may also need to be accounted for in the link budget.

In some embodiments, HF terminals 106 on earth can use frequency as a means of targeting their relay satellite cluster. Broad beam widths (of the order of 60 degrees) coupled with the frequency selective maximum gain direction allows multiple relay clusters to be targeted.

In some embodiments, the terminals 106 may be transformed from all beyond line of sight (BLOS) HF communication to line of sight (LOS) HF from Earth to Satellite or Satellite to Earth. For example, Maximum Path Loss for a 1000 Km link may be 120 dB, and BLOS connectivity may be supported using inter-satellite relays. For example, orbits may be selected that have a maximum slant range of 800 Km. For example, the ionosphere extends from 50 Kilometer (Km) to 1,000 Km in height above the earth. The LEO satellites 104 may be much lower than a top of the ionosphere, such as in 200 to 500 Km altitude range. But slant distances can be as much as 1000 Km from the earth when the satellite is not directly above.

In some embodiments, a link can be closed with a 25 Watt (W) power amplifier and sustain a data rate of 96 kilobits per second (kbps) using WBHF from earth, but may use a 100 W power amplifier on the satellite. In some embodiments, space to earth links might not be able to sustain data rates at 96 kbps at low frequencies at all times. For example, dropping the data rate to 72 kbps (signal-to noise-ratio (SNR): 14 dB) may provide a margin of 3 dB, and a data rate of 48 kbps (SNR: 11 dB) may provide a 6 dB margin.

WBHF is currently limited to 48 kHz. WBHF's most robust mode is 75 bps in 3 kHz and can be operated at SNRs as low as −8 dB. Some embodiments support 75 bps in 48 kHz, which may provide an additional 12 dB of processing gain to leverage for anti-jam and/or covert purposes. The earth to space link will typically be operated at channel bandwidths less than 48 kHz due to transmit limitations on existing systems, and hence have to be satisfied with relatively low processing gains on that front compared to relatively larger possible processing gains on the space to earth link.

In some embodiments, the space to earth link is expected to be more covert, because of the increase in bandwidth to 300 kHz. Delivering an average of 75 bps in a 300 kHz bandwidth permits performance of signal processing techniques that support Low Probability of Intercept (LPI) and/or Low Probability of Detection (LPD) characteristics without increasing the processing requirements of the space and earth terminals. In some embodiments, a coupler is only needed during transmission and, while receiving, the coupler can be bypassed on the earth based platforms to access wider channels, if needed.

Today, both ends of the HF link operate on the same frequency. In some embodiments, the transmission from the earth can be on one frequency, and the receive from the satellite 104 can be on different frequencies—as the space segment can select a frequency pseudo-randomly for talking to every node (e.g., terminal 106) on the earth.

In some embodiments, the simultaneous visibility of multiple geographically separated satellites 104 may ensure that the ionospheric conditions are different in the vicinity of each satellite 104 and improves the probability of successful message reception.

In some embodiments, covert communication may be supported that relies on frequency hopping and/or direct sequence spreading, as would be understood to those of skill in the art of secure signals.

Some embodiments may include forming a global network with N participants. An exemplary embodiment may include up to 256 participants; however, other embodiments may include a larger number of participants. For example, participants can be any terminal type (e.g., manpacks, vehicular, airborne, maritime, and/or fixed-site). Each earth based participant (e.g., 106) can select a transmit frequency that changes pseudo-randomly at a very slow rate, which may be intentional as most couplers use mechanical relays that have a life of 100,000 to 250,000 band switching cycles and may require 20+ milliseconds to tune the coupler. Each earth based participant (e.g., 106) can select its own frequency table that uses a set of receive frequencies. The space terminal (e.g., 104) may pseudo-randomly use one of the receive frequencies to communicate with the earth based terminal (e.g., 106). A coupler may have a tune time of 20 millisecond and high power transmitters may have a ramp up time of 10 milliseconds. Since some embodiments are using a low power transmitter and a coupler-less design, the space terminal (e.g., 104) can tune and ramp-up power within a millisecond, thereby permitting hops through the ad hoc satellite network 102 at a much faster rate. An inter-satellite HF networking layer may connect the HF satellites 104 using optical and/or RF inter-satellite cross links and create a global HF ad-hoc satellite network 102. These inter-satellite link may be stable for 15 to 20 minutes and can be networked by reactive and/or proactive means. In some embodiments, to ensure robustness, the link setup process may setup multiple routes between transmit and receive satellite 104 nodes, and messages can be sent over multiple paths based on configuration. For example, multiple satellites 104 can reach the earth terminal 106, and multiple geographically separated satellites 104 can receive the transmission from the earth terminal 106 due to an antenna pattern. This may enable an optimal set of satellites 104 to be selected to ensure that a message is seamlessly delivered with the a desired (e.g., required) level of robustness.

Referring now to FIG. 4, an exemplary embodiment of a method 400 according to the inventive concepts disclosed herein may include one or more of the following steps. Additionally, for example, some embodiments may include performing one more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially.

A step 402 may include transmitting, by a high frequency (HF) transmit antenna of a first terminal, a HF communication payload to an ad hoc satellite network, the ad hoc satellite network including multiple satellites, some or all of the multiple satellites communicatively coupled to other of the multiple satellites at any given time, the multiple satellites including a first satellite and a second satellite, each of the first satellite and a second satellite comprising: at least one receive HF antenna configured to receive HF signals; at least one transmit HF antenna configured to transmit HF signals; at least one inter-satellite transmitter configured to transmit signals to at least one other satellite of the ad hoc satellite network; at least one inter-satellite receiver configured to receive signals from at least one other satellite of the ad hoc satellite network; and at least one processor communicatively coupled to the at least one receive HF antenna, the at least one transmit HF antenna, the at least one inter-satellite transmitter, and the at least one inter-satellite receiver.

A step 404 may include receiving, by an HF receive antenna of a second terminal, the HF communication payload from the ad hoc satellite network.

Further, the method 400 may include any of the operations disclosed throughout.

As will be appreciated from the above, embodiments of the inventive concepts disclosed herein may be directed to a method for satellite networked high frequency terminal to terminal communications.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:

an ad hoc satellite network including multiple satellites, some or all of the multiple satellites communicatively coupled to other of the multiple satellites at any given time, the multiple satellites including a first satellite and a second satellite, each of the first satellite and the second satellite comprising:
  at least one receive high frequency (HF) antenna configured to receive HF signals, wherein the at least one receive HF antenna includes a receive-only HF antenna;
  at least one transmit HF antenna configured to transmit HF signals;
  at least one inter-satellite transmitter configured to transmit signals to at least one other satellite of the ad hoc satellite network;

at least one inter-satellite receiver configured to receive signals from at least one other satellite of the ad hoc satellite network; and at least one processor communicatively coupled to the at least one receive HF antenna, the at least one transmit HF antenna, the at least one inter-satellite transmitter, and the at least one inter-satellite receiver;

a first terminal including an HF transmit antenna configured transmit an HF communication payload to the ad hoc satellite network; and a second terminal including an HF receive antenna configured receive the HF communication payload from the ad hoc satellite network, wherein each of the first satellite and the second satellite is configured for coupler-less HF operation.

2. The system of claim 1, wherein the ad hoc satellite network is a global ad hoc satellite network, wherein the multiple satellites are low earth orbit (LEO) satellites.

3. The system of claim 2, wherein some or all of the multiple satellites are communicatively coupled to other of the multiple satellites at any given time via at least one of radiofrequency (RF) inter-satellite cross links or optical inter-satellite cross links, wherein a first group of multiple geographically separated satellites of the global ad hoc satellite network is visible to the first terminal, wherein a second group of multiple geographically separated satellites of the global ad hoc satellite network is visible to the second terminal, wherein successful transmission of the HF communication payload to the ad hoc satellite network is improved by visibility of the first group of multiple geographically separated satellites by the first terminal as compared to visibility of a single satellite, wherein successful reception of the HF communication payload from the ad hoc satellite network is improved by visibility of the second group of multiple geographically separated satellites by the second terminal as compared to visibility of a single satellite.

4. The system of claim 1, wherein the at least one transmit HF antenna includes a fractal transmit HF antenna.

5. The system of claim 1, wherein the HF transmit antenna of the first terminal is configured to transmit the HF communication payload to the first satellite of the ad hoc satellite network, wherein the HF receive antenna of the second terminal is configured to receive the HF communication payload from the second satellite of the ad hoc satellite network.

6. The system of claim 1, wherein the HF transmit antenna of the first terminal is configured to transmit the HF communication payload to the first satellite of the ad hoc satellite network, wherein the HF receive antenna of the second terminal is configured to receive the HF communication payload from the first satellite of the ad hoc satellite network.

7. The system of claim 1, wherein the HF transmit antenna of the first terminal is configured to transmit the HF communication payload on a first frequency to the ad hoc satellite network, wherein the HF receive antenna of the second terminal is configured to receive the HF communication payload on a second frequency from the ad hoc satellite network, the first frequency different from the second frequency.

8. The system of claim 7, wherein second frequency is pseudo-randomly selected.

9. The system of claim 7, wherein the first frequency is higher than is possible using an ionosphere reflective HF transmission.

10. The system of claim 1, wherein the first terminal is one of a manpack terminal, a ground vehicular terminal, an airborne vehicular terminal, a maritime vehicular terminal, or a fixed site terminal; wherein the second terminal is one of a manpack terminal, a ground vehicular terminal, an airborne vehicular terminal, a maritime vehicular terminal, or a fixed site terminal.

11. The system of claim 1, wherein communication of the HF communication payload from the first terminal to the second terminal via the ad hoc satellite network has a higher level of robustness than is possible using an ionosphere reflective HF transmission.

12. The system of claim 1, wherein covert communication of the HF communication payload from the first terminal to the second terminal via the ad hoc satellite network is supported by using at least one of frequency hopping or direct sequence spreading.

13. A method, comprising:
transmitting, by a high frequency (HF) transmit antenna of a first terminal, a HF communication payload to an ad hoc satellite network, the ad hoc satellite network including multiple satellites, some or all of the multiple satellites communicatively coupled to other of the multiple satellites at any given time, the multiple satellites including a first satellite and a second satellite, each of the first satellite and the second satellite comprising: at least one receive HF antenna configured to receive HF signals; at least one transmit HF antenna configured to transmit HF signals; at least one inter-satellite transmitter configured to transmit signals to at least one other satellite of the ad hoc satellite network; at least one inter-satellite receiver configured to receive signals from at least one other satellite of the ad hoc satellite network; and at least one processor communicatively coupled to the at least one receive HF antenna, the at least one transmit HF antenna, the at least one inter-satellite transmitter, and the at least one inter-satellite receiver; and receiving, by an HF receive antenna of a second terminal, the HF communication payload from the ad hoc satellite network, wherein the ad hoc satellite network is a global ad hoc satellite network, wherein the multiple satellites are low earth orbit (LEO) satellites, wherein some or all of the multiple satellites are communicatively coupled to other of the multiple satellites at any given time via at least one of radiofrequency (RF) inter-satellite cross links or optical inter-satellite cross links, wherein a first group of multiple geographically separated satellites of the global ad hoc satellite network is visible to the first terminal, wherein a second group of multiple geographically separated satellites of the global ad hoc satellite network is visible to the second terminal, wherein successful transmission of the HF communication payload to the ad hoc satellite network is improved by visibility of the first group of multiple geographically separated satellites by the first terminal as compared to visibility of a single satellite, wherein successful reception of the HF communication payload from the ad hoc satellite network is improved by visibility of the second group of multiple geographically separated satellites by the second terminal as compared to visibility of a single satellite.

14. A system, comprising:
a first terminal including a high frequency (HF) transmit antenna configured transmit an HF communication payload to an ad hoc satellite network; and a second terminal including an HF receive antenna configured receive the HF communication payload from the ad hoc satellite network, wherein the ad hoc satellite network includes multiple satellites, some or all of the multiple satellites communicatively coupled to other of the multiple satellites at any given time, the multiple satellites including a first satellite and a second satellite, each of the first satellite and the second satellite comprising: at least one receive HF antenna configured to receive HF signals; at least one transmit HF antenna configured to transmit HF signals; at least one inter-satellite transmitter configured to transmit signals to at least one other satellite of the ad hoc satellite network; at least one inter-satellite receiver configured to receive signals from at least one other satellite of the ad hoc satellite network; and at least one processor communicatively coupled to the at least one receive HF antenna, the at least one transmit HF antenna, the at least one inter-satellite transmitter, and the at least one inter-satellite receiver, wherein the at least one receive HF antenna includes a receive-only HF antenna, wherein each of the first satellite and a second satellite is configured for coupler-less HF operation.

15. The system of claim 14, wherein the ad hoc satellite network is a global ad hoc satellite network, wherein the multiple satellites are low earth orbit (LEO) satellites.

16. The system of claim 15, wherein some or all of the multiple satellites are communicatively coupled to other of the multiple satellites at any given time via at least one of radiofrequency (RF) inter-satellite cross links or optical inter-satellite cross links, wherein a first group of multiple geographically separated satellites of the global ad hoc satellite network is visible to the first terminal, wherein a second group of multiple geographically separated satellites of the global ad hoc satellite network is visible to the second terminal, wherein successful transmission of the HF communication payload to the ad hoc satellite network is improved by visibility of the first group of multiple geographically separated satellites by the first terminal as compared to visibility of a single satellite, wherein successful reception of the HF communication payload from the ad hoc satellite network is improved by visibility of the second group of multiple geographically separated satellites by the second terminal as compared to visibility of a single satellite.

17. The system of claim 14, wherein the HF transmit antenna of the first terminal is configured to transmit the HF communication payload to a first satellite of the ad hoc satellite network, wherein the HF receive antenna of the second terminal is configured to receive the HF communication payload from the first satellite of the ad hoc satellite network.

18. The system of claim 14, wherein the HF transmit antenna of the first terminal is configured to transmit the HF communication payload on a first frequency to the ad hoc satellite network, wherein the HF receive antenna of the second terminal is configured to receive the HF communication payload on a second frequency from the ad hoc satellite network, the first frequency different from the second frequency.

19. A system, comprising:
an ad hoc satellite network including multiple satellites, wherein the ad hoc satellite network is a global ad hoc satellite network, wherein the multiple satellites are low earth orbit (LEO) satellites, some or all of the multiple satellites communicatively coupled to other of the multiple satellites at any given time, the multiple satellites including a first satellite and a second satellite, each of the first satellite and the second satellite comprising:
  at least one receive high frequency (HF) antenna configured to receive HF signals;
  at least one transmit HF antenna configured to transmit HF signals;
  at least one inter-satellite transmitter configured to transmit signals to at least one other satellite of the ad hoc satellite network;
  at least one inter-satellite receiver configured to receive signals from at least one other satellite of the ad hoc satellite network; and
  at least one processor communicatively coupled to the at least one receive HF antenna, the at least one transmit HF antenna, the at least one inter-satellite transmitter, and the at least one inter-satellite receiver;
a first terminal including an HF transmit antenna configured transmit an HF communication payload to the ad hoc satellite network; and
a second terminal including an HF receive antenna configured receive the HF communication payload from the ad hoc satellite network,
wherein some or all of the multiple satellites are communicatively coupled to other of the multiple satellites at any given time via at least one of radiofrequency (RF) inter-satellite cross links or optical inter-satellite cross links, wherein a first group of multiple geographically separated satellites of the global ad hoc satellite network is visible to the first terminal, wherein a second group of multiple geographically separated satellites of the global ad hoc satellite network is visible to the second terminal, wherein successful transmission of the HF communication payload to the ad hoc satellite network is improved by visibility of the first group of multiple geographically separated satellites by the first terminal as compared to visibility of a single satellite, wherein successful reception of the HF communication payload from the ad hoc satellite network is improved by visibility of the second group of multiple geographically separated satellites by the second terminal as compared to visibility of a single satellite.

* * * * *